US007949712B2

(12) United States Patent
Friedman (10) Patent No.: US 7,949,712 B2
(45) Date of Patent: May 24, 2011

(54) HIGH AVAILABILITY PRESENCE ENGINE FOR INSTANT MESSAGING

(75) Inventor: Lee G. Friedman, Alpharetta, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 2821 days.

(21) Appl. No.: 10/364,273

(22) Filed: Feb. 10, 2003

(65) Prior Publication Data

US 2004/0158608 A1    Aug. 12, 2004

(51) Int. Cl.
*G06F 15/16*    (2006.01)
(52) U.S. Cl. .................... 709/206; 709/205; 709/207
(58) Field of Classification Search ........... 709/204–207
See application file for complete search history.

(56) References Cited

U.S. PATENT DOCUMENTS

| | | | |
|---|---|---|---|
| 4,868,818 A | 9/1989 | Madan et al. | |
| 6,212,548 B1 | 4/2001 | DeSimone et al. | |
| 6,539,421 B1 | 3/2003 | Appelman et al. | |
| 6,549,937 B1 | 4/2003 | Auerbach et al. | |
| 6,718,361 B1* | 4/2004 | Basani et al. | 709/201 |
| 6,807,565 B1* | 10/2004 | Dodrill et al. | 709/206 |
| 7,020,796 B1* | 3/2006 | Ennis et al. | 714/4 |
| 7,047,300 B1* | 5/2006 | Oehrke et al. | 709/226 |
| 7,171,473 B1* | 1/2007 | Eftis et al. | 709/227 |
| 2002/0052931 A1 | 5/2002 | Peiffer et al. | |
| 2002/0087704 A1* | 7/2002 | Chesnais et al. | 709/228 |
| 2002/0126701 A1* | 9/2002 | Requena | 370/469 |
| 2003/0018726 A1* | 1/2003 | Low et al. | 709/206 |
| 2003/0056002 A1* | 3/2003 | Trethewey | 709/238 |
| 2004/0003084 A1* | 1/2004 | Malik et al. | 709/225 |
| 2004/0017396 A1* | 1/2004 | Werndorfer et al. | 345/751 |
| 2004/0024909 A1* | 2/2004 | Yumoto et al. | 709/248 |
| 2004/0044738 A1* | 3/2004 | Ohno et al. | 709/206 |
| 2004/0086093 A1* | 5/2004 | Schranz | 379/37 |
| 2004/0128359 A1* | 7/2004 | Horvitz et al. | 709/207 |
| 2005/0044144 A1* | 2/2005 | Malik et al. | 709/205 |

OTHER PUBLICATIONS

The Microsoft Computer Dictionary, 5th Edition; Redmond, WA: Microsoft Press, May 1, 2002; pp. 81 and 315.
Yeong, et al.; "Lightweight Directory Access Protocol;" Internet RFC 1487, Jul. 1993; pp. 1-20.

* cited by examiner

*Primary Examiner* — Patrice L Winder
*Assistant Examiner* — Hieu Hoang
(74) *Attorney, Agent, or Firm* — Thomas, Kayden, Horstemeyer & Risley, LLP (57) ABSTRACT

Systems for a high availability presence engine for instant messaging service comprise a plurality of presence engines for receiving presence information on users and a global table engine accessible to the plurality of presence engines. The global table engine includes user presence information and receives presence changes from the plurality of presence engines. A plurality of local tables are accessible to the plurality of presence engines and the global table engine. The plurality of local tables are configured such that each of the plurality of local tables is associated with at least one of the plurality of presence engines, and is configured to receive presence change information from the global table engine. Other systems and methods are also provided.

51 Claims, 11 Drawing Sheets

LOCAL STATE TABLE ENTRY — 402

406 — USERID
408 — STATE ID
410 — STATE LABEL
412 — LOCAL DISTRIBUTION TABLE LIST POINTER

— 404

LOCAL DISTRIBUTION TABLE ENTRY

406 — USERID
414 — USERID (CONTACT)
416 — USERID (CONTACT)

FIG. 5

GLOBAL STATE TABLE ENTRY

GLOBAL DISTRIBUTION TABLE ENTRY

FIG. 6

STATE CHANGE MESSAGE

STATE REQUEST MESSAGE

HIGH AVAILABILITY PRESENCE ENGINE FOR INSTANT MESSAGING

TECHNICAL FIELD

The present invention is generally related to communications and, more particularly, is related to an instant messaging service.

BACKGROUND OF THE INVENTION

There exists a growing popularity in instant messaging services. Instant messaging is a type of communication using the World Wide Web and/or the Internet to create a group to which members of the group utilize a computing device to communicate with each other via private chat transactions. Service providers typically aim to grow usage of the instant messaging services while users are increasingly demanding a more reliable service.

In instant messaging and other real-time communications services, presence is a vital feature. Presence information can include data on the users such as connectivity details for user and the current availability of users to communicate with other available users. If an instant messaging user goes offline, enters a do not disturb state, etc., then the other instant messaging users need to know about the user's change in presence and that the user is unavailable for instant messaging. Presence engines provide this notification. Typically, a user establishes a list of users, sometimes referred to as a contact list, that the user may choose to have a chat transaction utilizing a computing device. Presence is utilized to inform the user regarding whether members of the user's contact list are available to communicate with the user. Presence is also utilized to indicate changes in status of the user to the members of the contact list.

Currently, users are associated with separate presence engines, i.e., user A will be associated with presence engine A, user B with presence engine B, user C with presence engine C, etc. In the existing environment, if user A is instant messaging and decides to go into a do not disturb state, then presence engine A sends an update to presence engine B, presence engine C, etc., such that every presence engine is updated to reflect user A's new presence status. At the same time, presence engine B and presence engine C (and others) are sending presence updates to other presence engines regarding presence changes for instant messaging users connected to them. As a result, a large number of presence change updates are continuously sent to presence engines.

Current implementations of instant messaging services have fundamental limits on scalability and reliability. Generally the limitations are due to the existing methods and configurations for providing presence information about users of the service. Traditional instant messaging systems utilize platforms that are configured such that presence information about each user is replicated in each processing device. This configuration requires that each time a user's presence changes, every user on the system receives notification of the presence change. Thus, a presence change notification is sent to every user, even users that are not a part of the contact list of the user whose presence has changed. Providing continuous updates to users regarding presence changes is inefficient, and is not easily scalable because the more presence engines involved, the more presence updates that need to be sent and received. Further, the ability to provide a reliable 7×24 hour service is limited since if presence information regarding a user is lost, each user on the system has to receive notification of the presence change for that user.

Thus, a heretofore-unaddressed need exists for a solution that addresses the aforementioned deficiencies and inadequacies.

SUMMARY OF THE INVENTION

The preferred embodiments of the present invention provide systems and methods for deploying a high availability presence engine for instant messaging service.

Briefly described, in architecture, one preferred embodiment of the system, among others, can be implemented as follows. A system for a high availability presence engine for instant messaging service comprises a plurality of presence engines for receiving presence information on users and a global table engine accessible to the plurality of presence engines. The global table engine includes user presence information and is operable to receiving presence changes from the plurality of presence engines. A plurality of local tables is accessible to the plurality of presence engines and the global table engine. The plurality of local tables is configured such that each of the plurality of local tables is associated with at least one of the plurality of presence engines. Further, the local table is configured to receive presence change information from the global table engine.

The preferred embodiment of the present invention can also be viewed as providing methods for deploying a high availability presence engine for instant messaging service. In this regard, one embodiment of such a method, among others, can be broadly summarized by the following steps: receiving a user's presence change information in a global table; updating the global table to reflect the change in the user's presence information; and sending updated presence information on the user to local tables of contacts affected by the change in the user's presence.

The preferred embodiment of the present invention can also be viewed as providing methods for determining status of a user of a high availability instant messaging system. In this regard, one embodiment of such a method, among others, can be broadly summarized by the following steps: querying for presence status of a user; determining whether information on the user resides in a local table; and returning the status of the user to the requesting client when information on the user resides in the local table.

The preferred embodiment of the present invention can also be viewed as providing methods for removing a user from a high availability presence engine for instant messaging system. In this regard, one embodiment of such a method, among others, can be broadly summarized by the following steps: receiving a presence change of a user to an offline state; sending the presence change to a global table; and purging the user's user identification from the global table.

Other systems, methods, features, and advantages of the present invention will be or become apparent to one with skill in the art upon examination of the following drawings and detailed description. It is intended that all such additional systems, methods, features, and advantages be included within this description, and be within the scope of the present invention.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION OF THE PREFERRED EMBODIMENTS

Disclosed herein are systems and methods for deploying a high availability presence engine for instant messaging service. To facilitate description of the inventive system, an example system that can be used to implement the systems and methods for deploying a high availability presence engine for instant messaging system is discussed with reference to the figures. Although this system is described in detail, it will be appreciated that this system is provided for purposes of illustration only and that various modifications are feasible without departing from the inventive concept. After the example system has been described, an example of the operation of the system will be provided to explain one manner in which the system can be used to provide for the deployment of a high availability presence engine for instant messaging.

Figure 1:
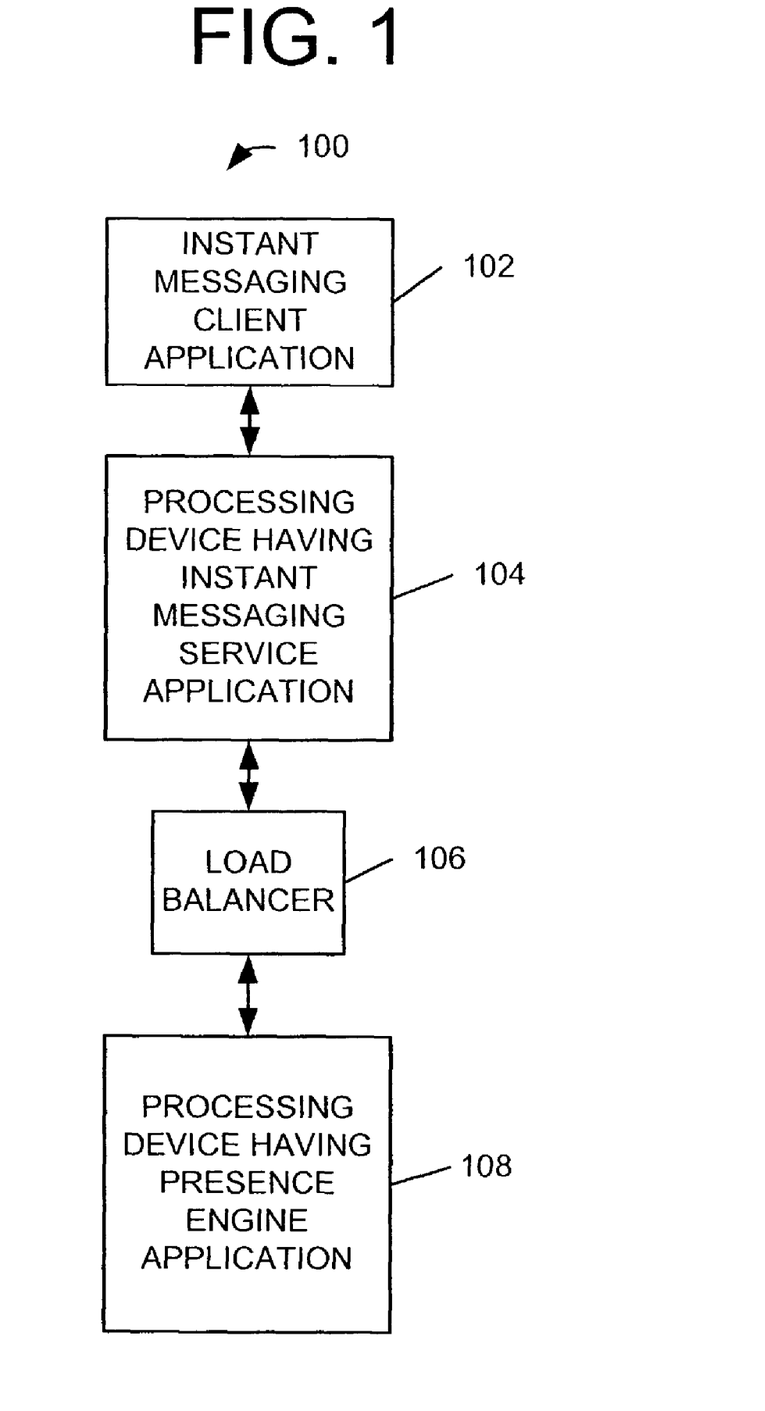
FIG. 1 is a block diagram depicting a preferred embodiment of a system in which a high availability presence engine for instant messaging may be implemented.

Referring now in more detail to the drawings, in which like numerals indicate corresponding parts throughout the several views, FIG. 1 is a block diagram depicting a preferred embodiment of a system 100 in which a high availability presence engine for instant messaging may, be implemented. A preferred embodiment of the system 100 includes front end processing devices configured with software such as client applications 102 (also referred to as client or clients) adapted to provide an instant messaging software that is operatively coupled to a processing device 104 configured with an instant messaging service application. A load balancer 106 couples to the processing device 104 and a processing device such as a server 108 configured with a presence engine application. A suitable load balancer 106 is available from Cisco Systems, among others. The load balancer 106 includes rules for balancing the load from devices, such as processing devices running an instant messaging client application and/or instant messaging service that requests access to the server 108.

Figure 2:
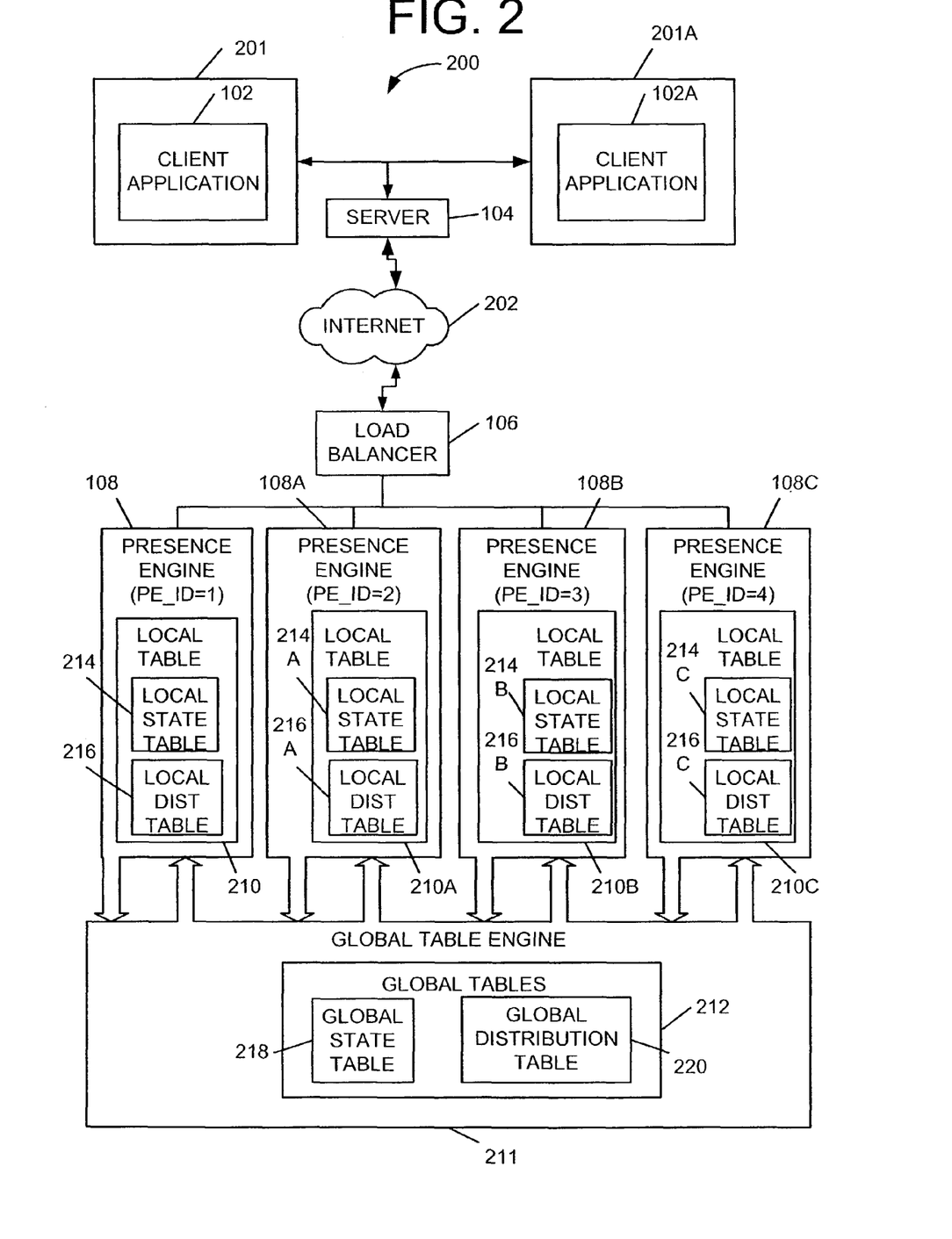
FIG. 2 is a block diagram depicting a preferred embodiment of an illustrative example of a system for implementing a high availability presence engine for instant messaging.

FIG. 2 is a block diagram depicting a preferred embodiment of an illustrative example of a system 200 for implementing a high availability presence engine for instant messaging. Client applications, such as instant messaging client applications 102, 102A running on a client processing device 201, 201A couple to the processing device for instance a server 104 configured with IM server application. The server 104 is operatively coupled to a communications network 202. The communications network 202 may be any type of communications network employing any network topology, transmission medium, or network protocol. For example, such a network may be any public or private packet-switched or other data network, including the Internet, circuit-switched network, such as a public switch telecommunications network (PSTN), wireless network, or any other desired communications infrastructure and/or combination of infrastructure. As shown in FIG. 2, the communications network 202 is configured as the Internet. In a preferred embodiment, presence changes from the client application 102, 102A traverse the network 202 and reach the load balancer 106. The load balancer 106 is operatively coupled to a plurality of servers (also referred to as presence engines), 108A, 108B and 108C configured with presence engines applications (while four presence engines are shown in FIG. 2, the invention is not limited to this number of presence engines).

In a preferred embodiment, each presence engine 108, 108A, 108B and 108C is configured as a processing device and includes software such as presence instance logic (shown in FIG. 3) and local tables 210, 210A, 210B, and 210C. In one embodiment, the local tables 210, 210A, 210B and 210C include a local state table 214, 214A, 214B and 214C and a local distribution table 216, 216A, 216B and 216C. In an example, the local state table 214, 214A, 214B and 214C includes data sent from a global table engine 211 that reflects the current known state of the user. In an example, the local distribution table 216, 216A, 216B and 216C includes information on contacts, which must be sent updated presence information.

The global table engine 211 is preferably a processing device configured to communicate with each presence engine 108, 108A, 108B and 108C. In an alternative embodiment, a load balancer (not shown) is coupled between the presence engines 108, 108A, 108B and 108C and the global table engine 211 to balance traffic between the presence engines 108, 108A, 108B and 108C and the global table engine 211. In one preferred embodiment, the global table engine 211 is a shared resource that is configured to be redundant and fault tolerant. The global table engine 211 includes global tables 212 (only one shown for simplicity). Each global table 212 includes a global state table 218 and a global distribution table 220. In an example, the global state table 218 includes information sent from the client application 102, 102A regarding the current known state of the user. In an example, the global distribution table 220 includes information on the local tables 210, 210A, 210B and 210C, which receives updated presence information in the event of a presence change.

The presence engines 108, 108A, 108B and 108C are selected by the load balancer 106 to receive the presence change information and requests from clients 102, 102A based upon the availability of the presence engines 108, 108A, 108B and 108C. For instance if presence engine 108A can handle the additional traffic load, it is selected as the presence instance 108A to process the presence change information. The presence change information is sent from presence engine 108A to the global table 212 that receives information, such as presence changes. The global table 212 sends presence change information to the local table (or tables) 210, 210A, 2101B and 210C coupled to the global table 212 for contacts which must receive updated presence information. Preferably, the global table 212 includes the username of the person who's status is changing, presence information on the user, a personalized text label for the user, and a pointer that points to local table entry caches. In an example, the presence information can includes the state of the user such as available, away, extended away, do not disturb or offline. The global table 212 also includes information used when a user requests information on the current state of a contact. Contacts include a list of individuals that the users have identified as persons with which the user may wish to have chat transactions utilizing instant messaging. In an example, the information includes the username of the person making the request, a request type, and an identification of the local tables of presence engines for receiving updated presence information. The request type can include but is not limited to information such as status, status all, chat, file Xfer and logon.

In one aspect of the invention, presence changes from instant messaging client applications 102, 102A are balanced through the load balancer 106 to the presence engines 108, 108A, 1081B and 108C. The global table 212 contains information on which users are present and the status of these users, for instance, to what degree those users are currently available, and which presence engine 108, 108A, 108B and 108C the users are each utilizing. Presence changes are written to the global table 212. When a user's presence changes, the global table 212 updates members of the user's contact list. The global table engine 211 sends presence change information to the local table 210, 210A, 210B and 210C for members of the user's contact list based upon which presence engine 108, 108A, 108B and 108C is associated with which local table 210, 210A, 210B and 210C. By storing the presence information in the global table engine 211 in a centralized manner, presence changes can be efficiently sent only to affected local tables 210, 210A, 210B and 210C as needed to facilitate transactions between a user and the user's contacts.

Figure 3:
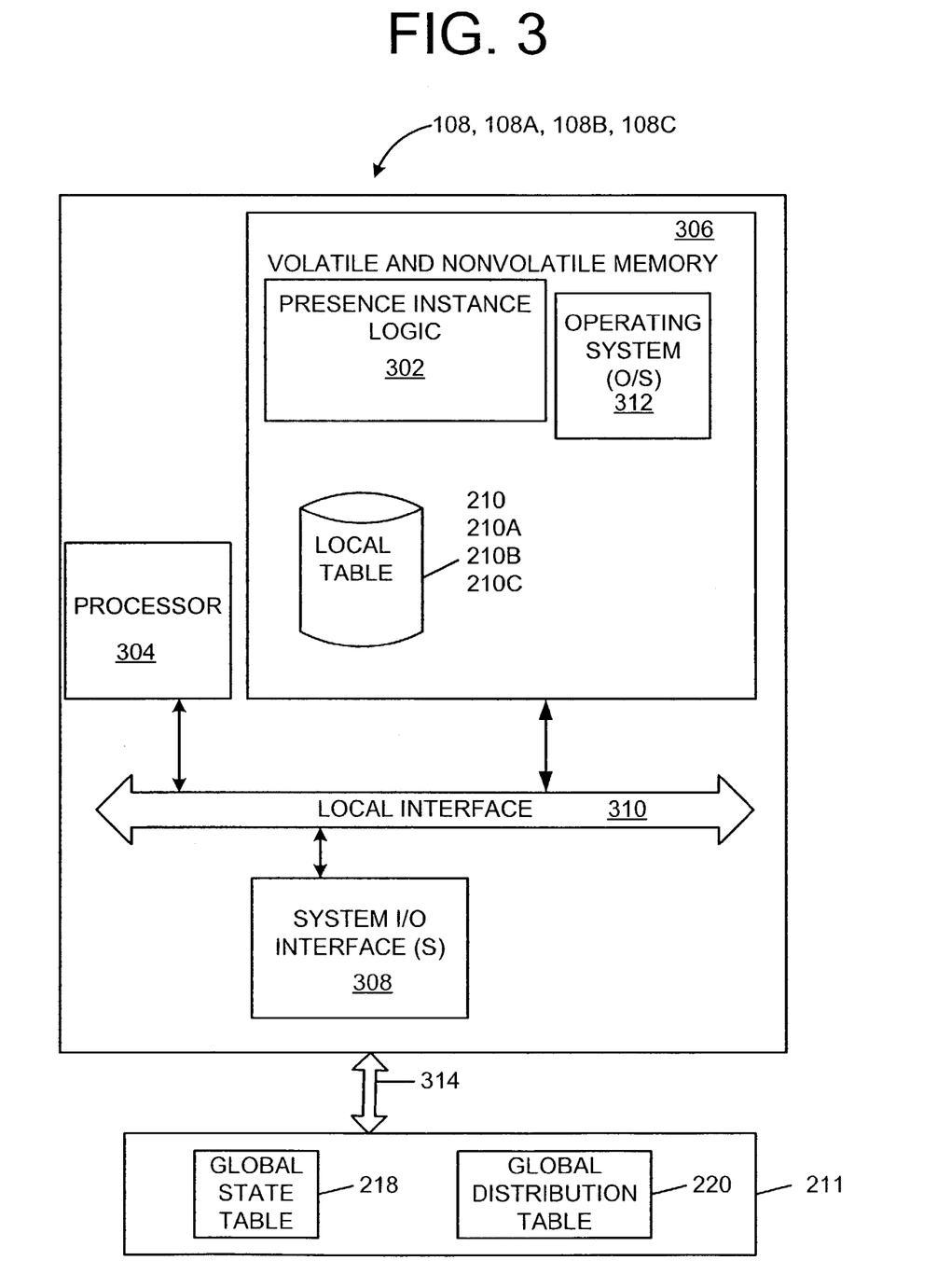
FIG. 3 is a block diagram depicting a computer or processor-based system that can be used to implement a preferred embodiment of the high availability presence engine for instant messaging.

FIG. 3 is a block diagram depicting a computer or processor-based system such as presence engine 108, 108A, 108B and 108C that can be used to implement a preferred embodiment of the high availability presence engine for instant messaging. As shown in FIG. 3, the deployment of presence instance logic 302 can be implemented in software (e.g., programming stored on a medium, firmware, etc.), hardware, or a combination thereof. In an example, the presence instance logic 302 is configured to provide managing state change and state request information utilized by the presence engines 108, 108A, 108B and 108C. In the preferred embodiments, the presence instance logic 302 is implemented in software as an executable program, and is executed by a special or general purpose digital computer, such as a personal computer (PC; IBM-compatible, Apple-compatible, or otherwise), workstation, minicomputer, or mainframe computer. An example of a general-purpose computer that can implement the presence instance logic 302 of the preferred and alternate embodiments of the present invention is shown in FIG. 3.

Generally, in terms of hardware architecture, as shown in FIG. 3, the presence engine 108, 108A, 108B and 108C includes, inter alia, a processing device 304 and memory 306. Input and/or output (I/O) devices 308 (or peripherals) can be communicatively coupled to a local interface 310. In a preferred embodiment, memory 306 is configured to include an operating system 312, presence instance logic 302, and local tables 210, 210A, 210B and 210C. The local interface 310 can be, for example but not limited to, one or more buses or other wired or wireless connections, as is known in the art. The local interface 310 may have additional elements, which are omitted for simplicity, such as controllers, buffers (caches), drivers, repeaters, and receivers, to enable communications. Further, the local interface 310 may include address, control, and/or data connections to enable appropriate communications among the aforementioned components.

The presence instance logic 302 may be utilized to control access to data contained in the local tables 210, 210A, 210B and 210C and the global table engine 211. An interface 314 can be provided for accessing to the global table engine 211.

The processing device 304 is preferably a hardware device for executing software, particularly that stored in memory 306. The processing device 304 can preferably be any custom made or commercially available processor, a central processing unit (CPU), an auxiliary processor among several processors, a semiconductor based microprocessor (in the form of a microchip or chip set), a macroprocessor, or generally any device for executing software instructions.

The memory 306 can include any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory 306 may incorporate electronic, magnetic, optical, and/or other types of storage media. Note that the memory 306 can have a distributed architecture, where various components are situated remote from one another, but can be accessed by the processing device 304.

The software and/or firmware in memory 306 may include one or more separate programs, each of which comprises an ordered listing of executable instructions for implementing logical functions. The operating system 312 essentially controls the execution of other computer programs, such as the presence instance logic 302 and local tables 210, 210A, 210B and 210C, and provides scheduling, input-output control, file and data management, memory management, and communication control and related services.

When the presence instance logic 302 and local tables 210, 210A, 210B, 210C are implemented as a source program, the program needs to be translated via a compiler, assembler, interpreter, or the like, which may or may not be included within the memory 306, so as to operate properly in connection with the O/S 312. Furthermore, the presence instance logic 302 and local tables 210, 210A, 210B and 210C can be written as (a) an object oriented programming language, which has classes of data and methods, or (b) a procedure programming language, which has routines, subroutines, and/or functions, for example but not limited to, C, C++, Pascal, Basic, Fortran, Cobol, Perl, Java, and Ada.

The I/O devices 308 may preferably include input devices, for example but not limited to, a keyboard, mouse, scanner, microphone, etc. Furthermore, the I/O devices 308 may also include output devices, for example but not limited to, a printer, display, etc. Finally, the I/O devices 308 may further include devices that communicate both inputs and outputs, for instance but not limited to, a modulator/demodulator (modem; for accessing another device, system, or network), a radio frequency (RF) or other transceiver, a telephonic interface, a bridge, a router, etc.

When the presence instance logic 302 and local tables 210, 210A, 210B and 210C are implemented in software, as is shown in FIG. 3, it should be noted that the presence instance logic 302 and local tables 210, 210A, 210B and 210C, can preferably be stored on any computer-readable medium for use by or in connection with any computer related system or method. The presence instance logic 302 and local tables 210, 210A, 210B and 210C can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer-readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory. If implemented in hardware, as in an alternative embodiment, the presence instance logic 302 and local tables 210, 210A, 210B and 210C can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 4:
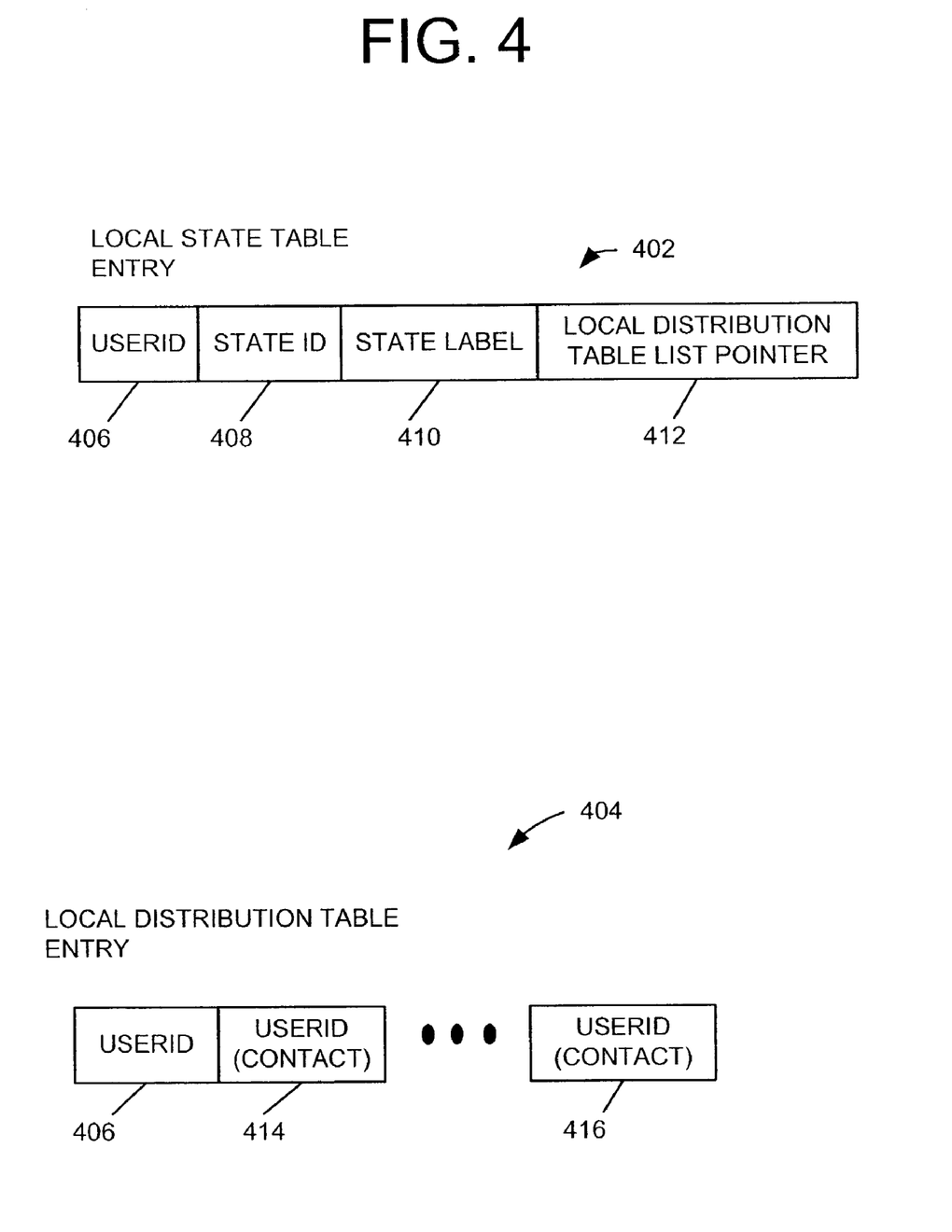
FIG. 4 is a block diagram of a preferred embodiment of an illustrative example of entries implemented in local tables of a high availability presence engine for instant messaging.

FIG. 4 is a block diagram of a preferred embodiment of an illustrative example of entries implemented in local tables of a high availability presence engine for instant messaging. In an example, elements included in local state table entries 402 and local distribution table entries 404 are shown. In one embodiment, the local state table entries 402 include a user identification (ID) 406, a state ID 408, a state label 410 and a local distribution table list pointer 412. The user ID 406 includes the username of the person whose status is changing. The state ID 408 includes a state such as available, away, extended away, do not disturb or offline, among other examples. A state label 410 can include a personalized text label such as "I am away from the office now. Be back soon." The user ID 406, state ID 408 and state label 410 encompasses data in the local state table entry 402 that is sent from the global state table 218 and reflects the current known state of the user. The local distribution table list pointer 412 points to an entry for the user's contact list.

The local distribution table entry 404 preferably includes the user ID 406 and a plurality of user IDs (contact) 414, 416. The user IDs (contact) 414, 416 include the list of contacts which will receive the updated presence information.

Figure 5:
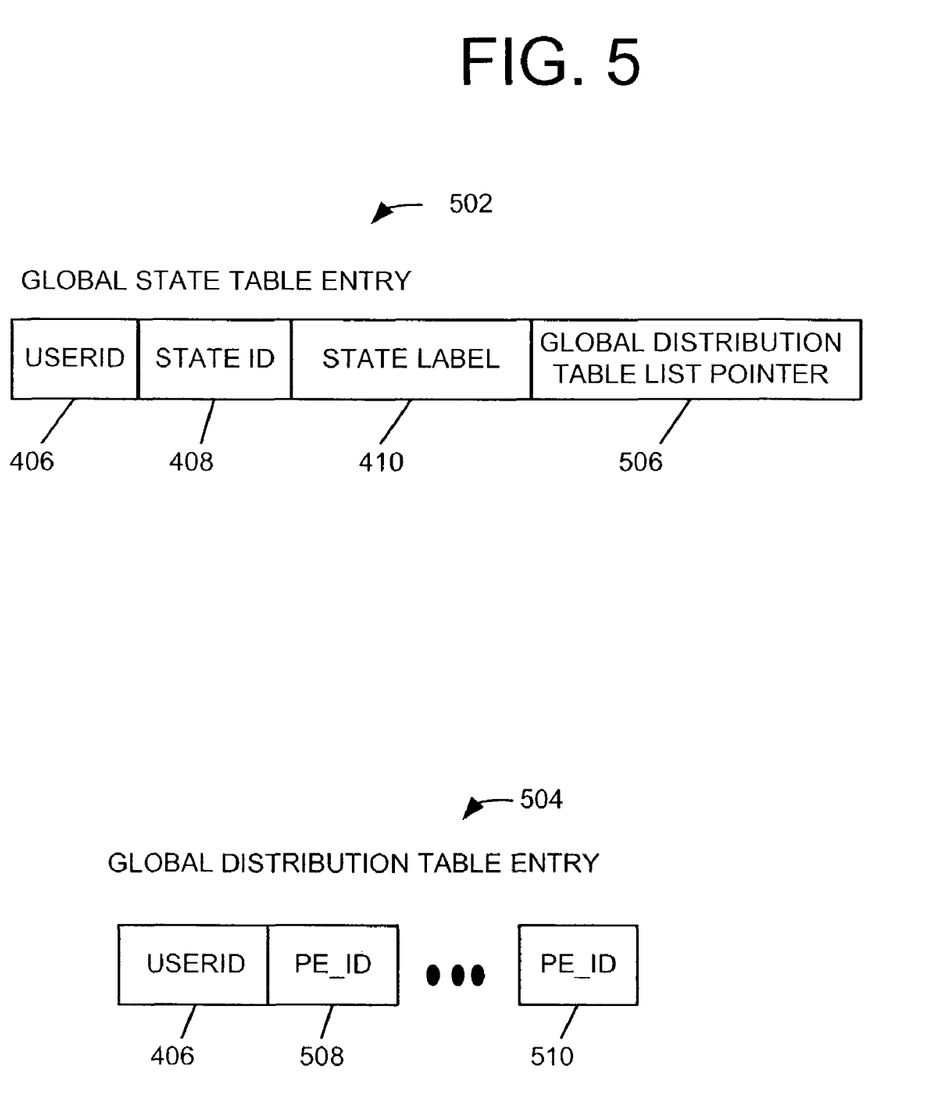
FIG. 5 is a block diagram of a preferred embodiment of an illustrative example of entries implemented in a global table of a high availability presence engine for instant messaging.

FIG. 5 is a block diagram of a preferred embodiment of an illustrative example of entries implemented in a global table of a high availability presence engine for instant messaging. In an example, elements included in global state table entries 502 and global distribution table entries 504 are shown. In one embodiment, the global state table entries 502 include a user identification (ID) 406, a state ID 408, a state label 410 and a global distribution table list pointer 412. The user ID 406 includes the username of the person whose status is changing. The state ID 408 includes a state such as available, away, extended away, do not disturb or offline. A state label 410 can include a personalized text label. The user ID 406, state ID 408 and state label 410 encompasses data sent from the client application 102, 102A and reflects the current known state of the user. The global distribution table list pointer 506 is a pointer established with the global distribution table 220 and points to an entry for the local table entry memory, caches, among other memory types.

The global distribution table entry 504 includes the user ID 406 and a plurality of presence engine IDs (PE_ID) 508, 510. Each presence engine 108, 108A, 108B and 108C includes a unique identification, such as PE_ID=1, PE_ID=2, etc. The PE_ID includes a list of local tables, which will be sent updated presence information.

Figure 6:
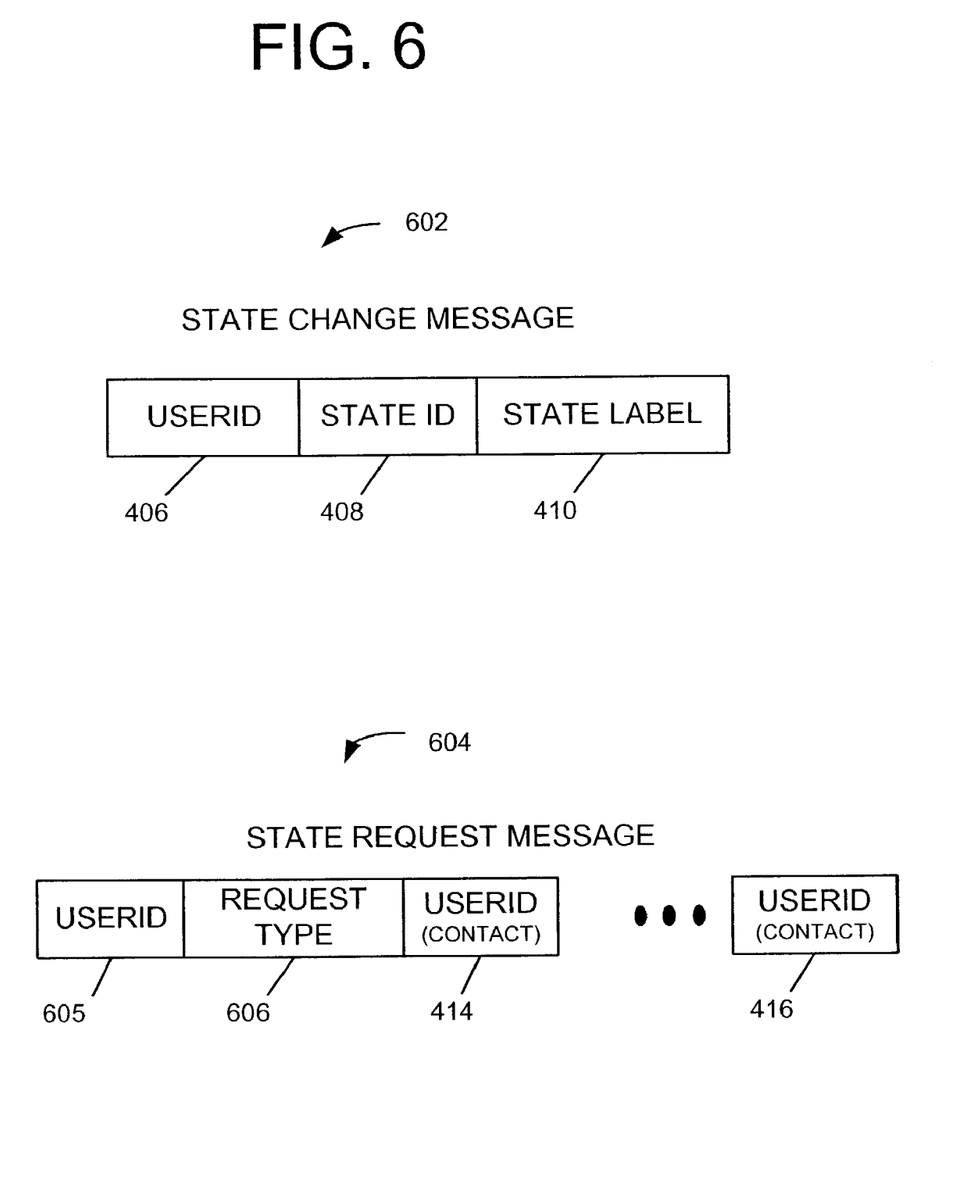
FIG. 6 is a block diagram of a preferred embodiment of an illustrative example of state change and state request messages implemented in a high availability presence engine for instant messaging.

FIG. 6 is a block diagram of a preferred embodiment of an illustrative example of state change and state request messages implemented in a high availability presence engine for instant messaging. In an example the messages include a state change message 602 and a state request message 604. In a preferred embodiment, the state change message includes a user identification (ID) 406, a state ID 408, a state label 410. The user ID 406 includes the username of the person making the request. The state ID 408 includes a state such as available, away, extended away, do not disturb or offline. A state label 410 can include a personalized text label. The user ID 406, state ID 408 and state label 410 encompasses data sent from the client application 102, 102A and reflects the current known state of the user.

In a preferred embodiment, the state request message 604 includes a user ID 605, a request type 606 and a plurality of user ID (contact) 414, 416. The user ID 605 includes the username of the person making the request. In an example, the request type includes requesting status, status all, chat, file Xfer and logon.

Figure 7:
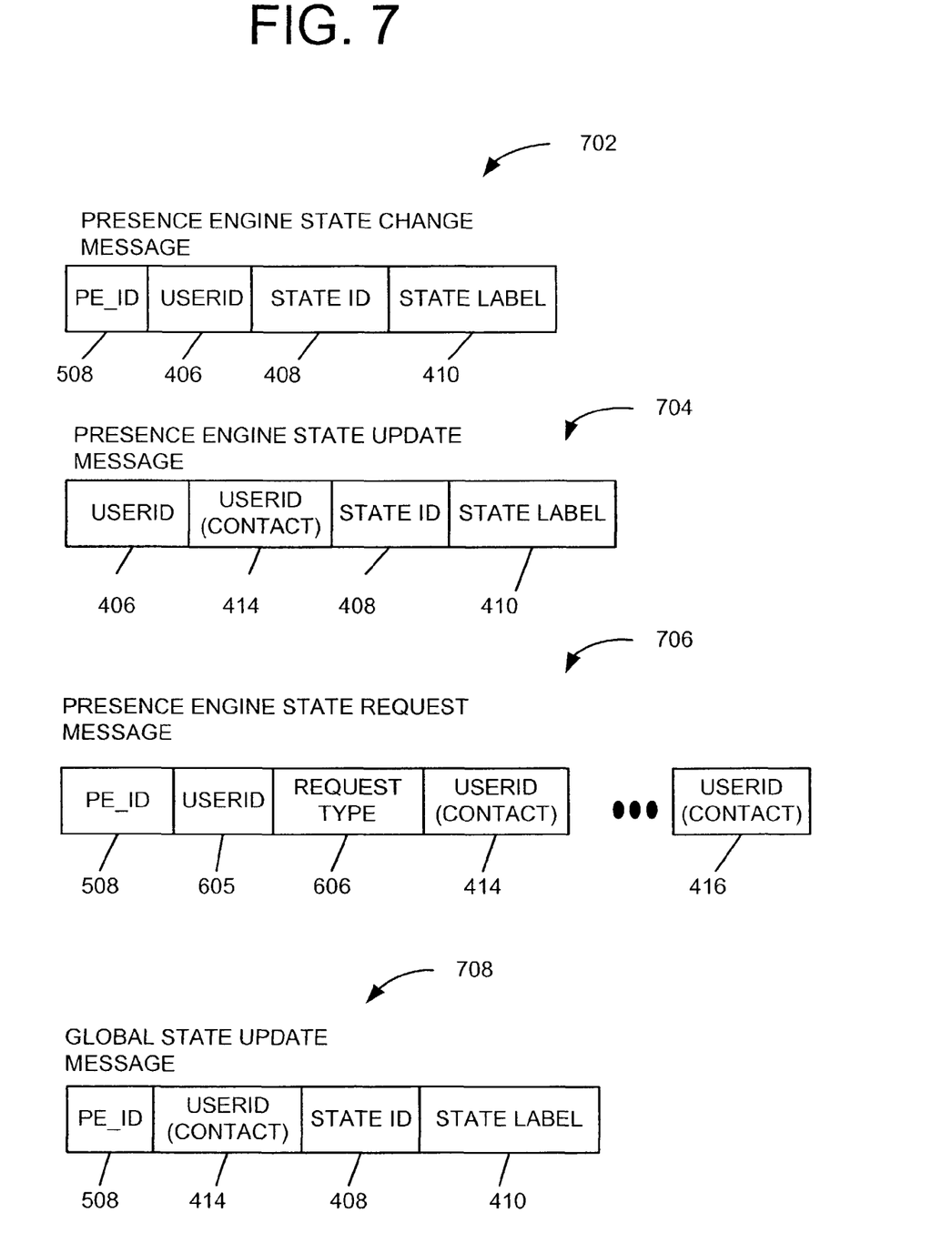
FIG. 7 is a block diagram of a preferred embodiment of an illustrative example of messages implemented in a global table of a high availability presence engine for instant messaging.

FIG. 7 is a block diagram of a preferred embodiment of an illustrative example of messages implemented in a global table of a high availability presence engine for instant messaging. In an example, the messages include a presence engine state change message 702, a presence engine state update message 704, a presence engine state request message 706 and a global state update message 708. In a preferred embodiment, the presence engine state change message includes a PE_ID 508, a user ID 406, a state ID 408 and a state label 410. In a preferred embodiment, the presence engine state update message 704 includes a user ID 406, a user ID (contact) 414, a state ID 408 and a state label 410. In a preferred embodiment, the presence engine state request message 706 includes a PE_ID 508, a user ID 605, request type 606, and a plurality of user ID (contacts) 414, 416. In a preferred embodiment, the global state update message 708 includes a PE_ID 508, user ID (contact) 414, state ID 408, and state label 410.

Figure 8:
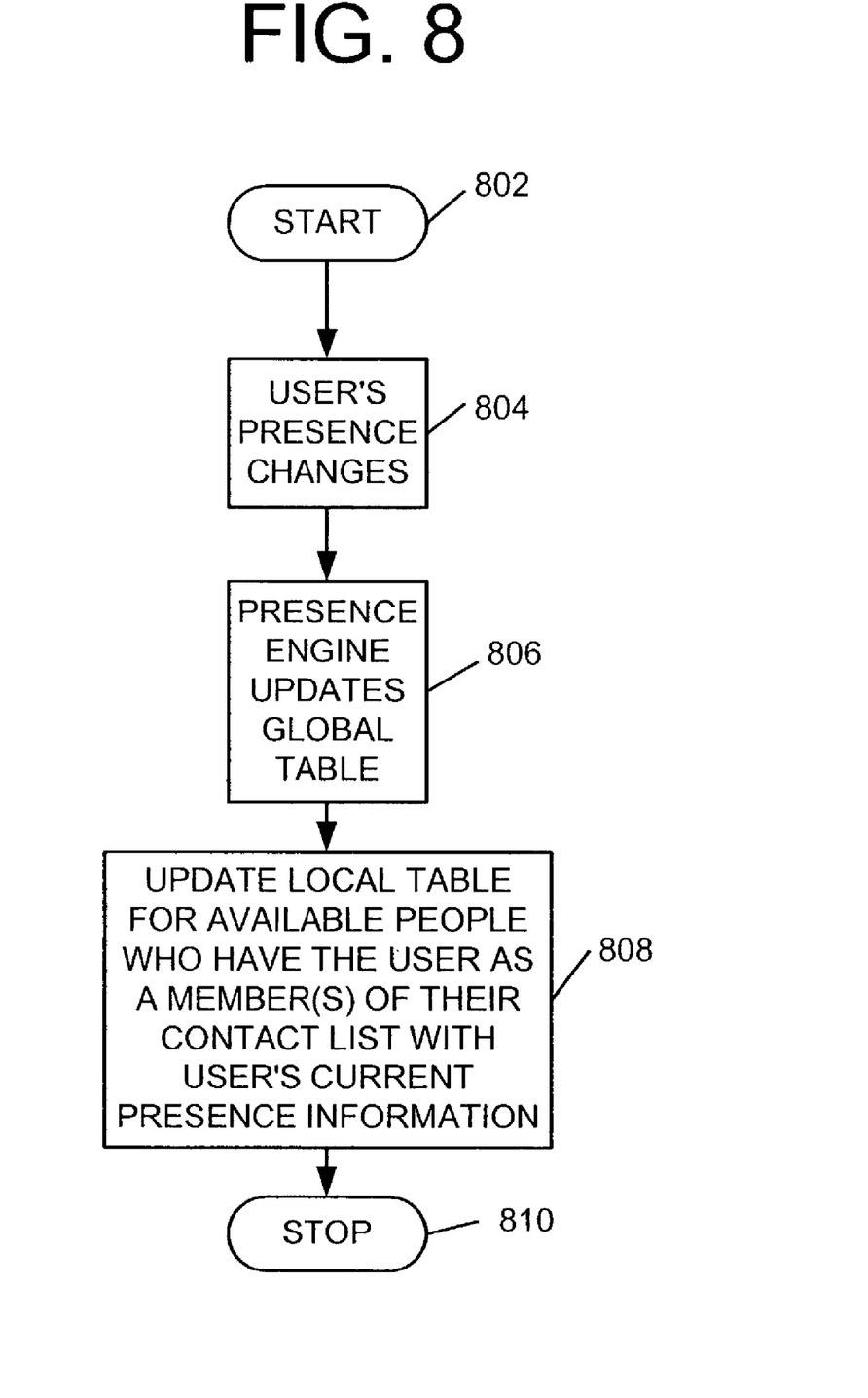
FIG. 8 is a flow chart depicting general functionality of a preferred embodiment for implementing a high availability presence engine for instant messaging.

FIG. 8 is a flow chart depicting general functionality (or method) of a preferred embodiment for implementing a high availability presence engine for instant messaging. The process begins at 802. At 804 a user's presence changes. Illustrative examples of presence changes include a user logging out of the system, or changing status from available to away, among others. At 806, a presence engine updates a global table that contains presence information on the user and members of the user's contact list, to reflect the change in the user's status. At 808, the global table updates local tables of the user's contacts affected by the change in user's presence. In an example, a message is generate to those contacts regarding the change in user's presence. The process ends at 810.

Figure 9:
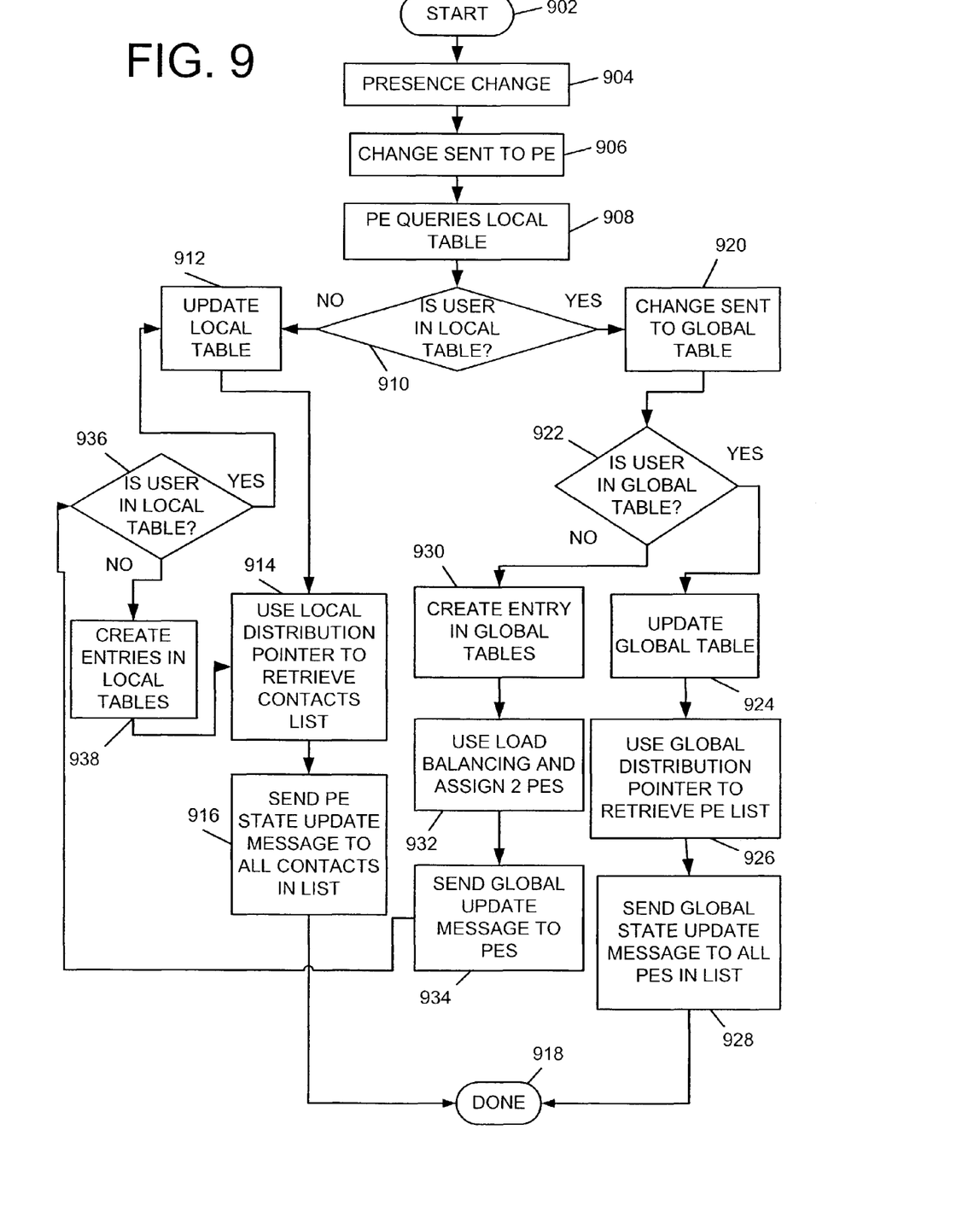
FIG. 9 is a flow chart depicting functionality of a preferred embodiment for implementing a presence change in a high availability presence engine for instant messaging.

FIG. 9 is a flow chart depicting functionality (or method) of a preferred embodiment for implementing a presence change in a high availability presence engine for instant messaging. The process begins at 902. At 904 a user's presence change occurs. A presence change can include the user transitioning from an available state to an away state, or going offline, among other presence changes. At 904, the presence change information is sent to a presence engine. In a preferred embodiment, the presence change information is sent from a client application to a communications network, such as the Internet, to a load balancer that sends the presence change information to an available presence engine. At 908, the presence engine queries an associated local table. At 910, a determination is made as to whether the user is in the local table. If the user is not in the local table, at 912 the local table is updated to include user information. In a preferred embodiment, the information updated in the local table includes the user ID, a state ID, a state label and a local distribution table list pointer. At 914, the local distribution pointer is utilized to retrieve contacts list. At 916, a presence engine state update message is sent to all contacts in list. In a preferred embodiment, the presence engine state update message includes a user ID, a user ID for contacts, a state ID and a state label. The process ends at 918.

If the user is in the local table and if the user is not in the local table, at 920, a change is sent to the global table. At 922, a determination is made as to whether the user is in the global table. If the user is in the global table, at 924, the global table is updated. At 926, the global table distribution pointer is utilized to retrieve the presence engine list. In a preferred embodiment, the global table distribution pointer is a pointer established with the global distribution table and points to the entry for the local table entry caches. At 928, a global state update message is sent to all presence engines in the presence engine list. The process ends at 918.

If the user is not in the global table, at 930, an entry is created in the global table. In a preferred embodiment, the global state table entry includes a user ID, a state ID, a state label and a global distribution table list pointer. At 932, a presence engine is assigned for the user and any associated contacts. In a preferred embodiment, a load balancer is utilized to determine which presence engines have capacity to add additional users. At 934, a global update message is sent to impacted presence engines regarding the assignment of the user and any associated contacts. At 936, a determination is made as to whether the user is in a local table. If yes, at 912 the local table is updated and the process continues. If no, at 938, entries are created in appropriate local tables. The process continues at 914. When no more updates need to be sent, the process ends at 918.

Figure 10:
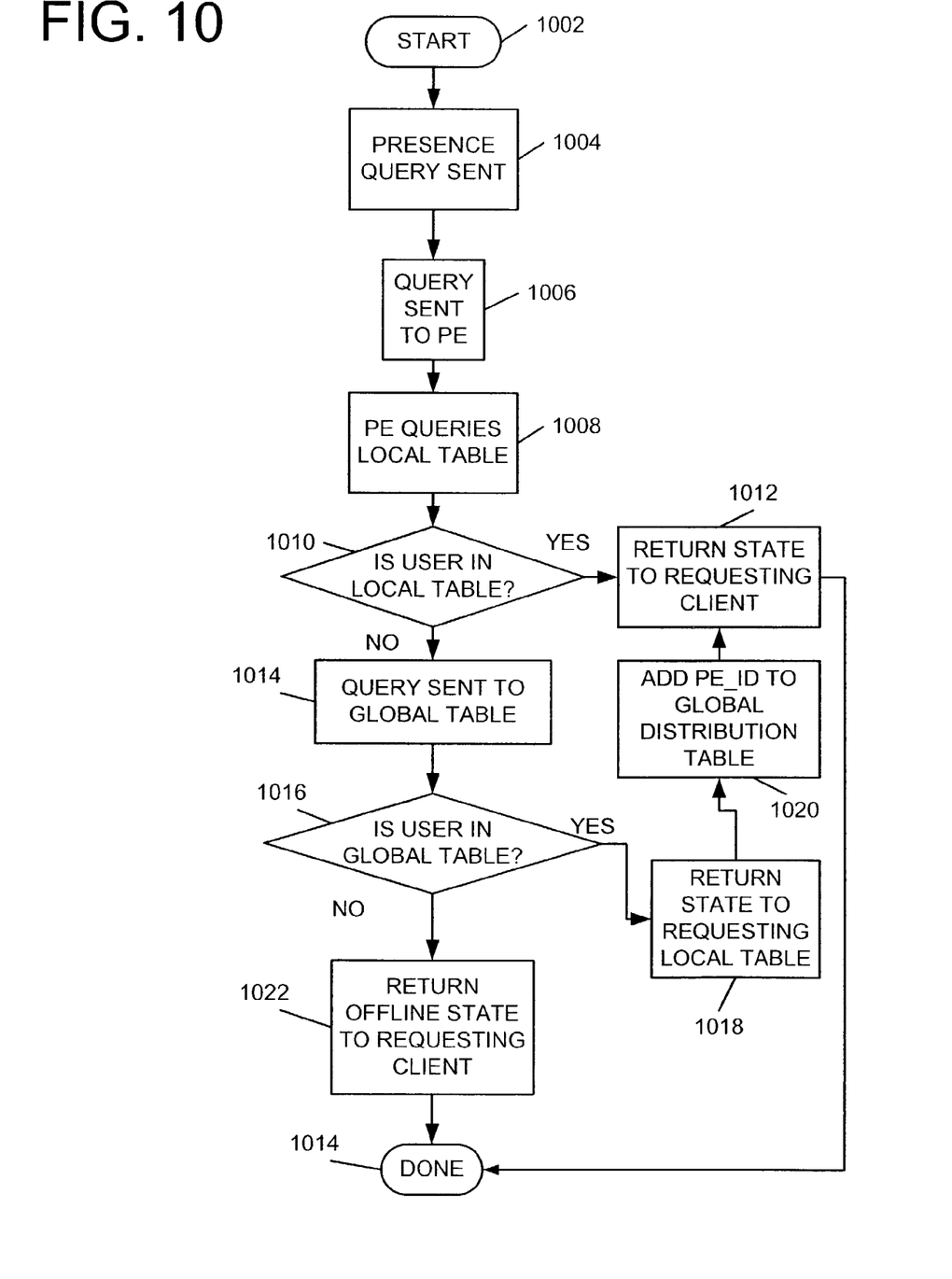
FIG. 10 is a flow chart depicting functionality of a preferred embodiment for implementing a state query in a high availability presence engine for instant messaging.

FIG. 10 is a flow chart depicting functionality (or method) of a preferred embodiment for implementing a state query in a high availability presence engine for instant messaging. The process begins at 1002. At 1004, a presence query is sent. In a preferred embodiment, a presence query is sent by a client application. At 1006, the query is sent to a presence engine. The presence engine queries an associated local table at 1008. At 1010, a determination is made as to whether the user is in the local table. If yes, at 1012, the state of the user is returned to the requesting client. The process ends at 1014.

If the user is not in the local table, at 1014, a query is sent to the global table. At 1016, a determination is made as to whether the user is in the global table. If yes, at 1018, the state of the user is returned to the requesting local table. At 1020, the particular presence engine ID is added to the global distribution table. In a preferred embodiment, the global distribution table entry include the user ID and presence engine IDs for local tables which must be sent updated presence state information. At 1012, the process continues by returning the state of the user to the requesting client.

If the user is not in the global table, at 1022, an offline state is returned to the requesting client. The process ends at 1014.

Figure 11:
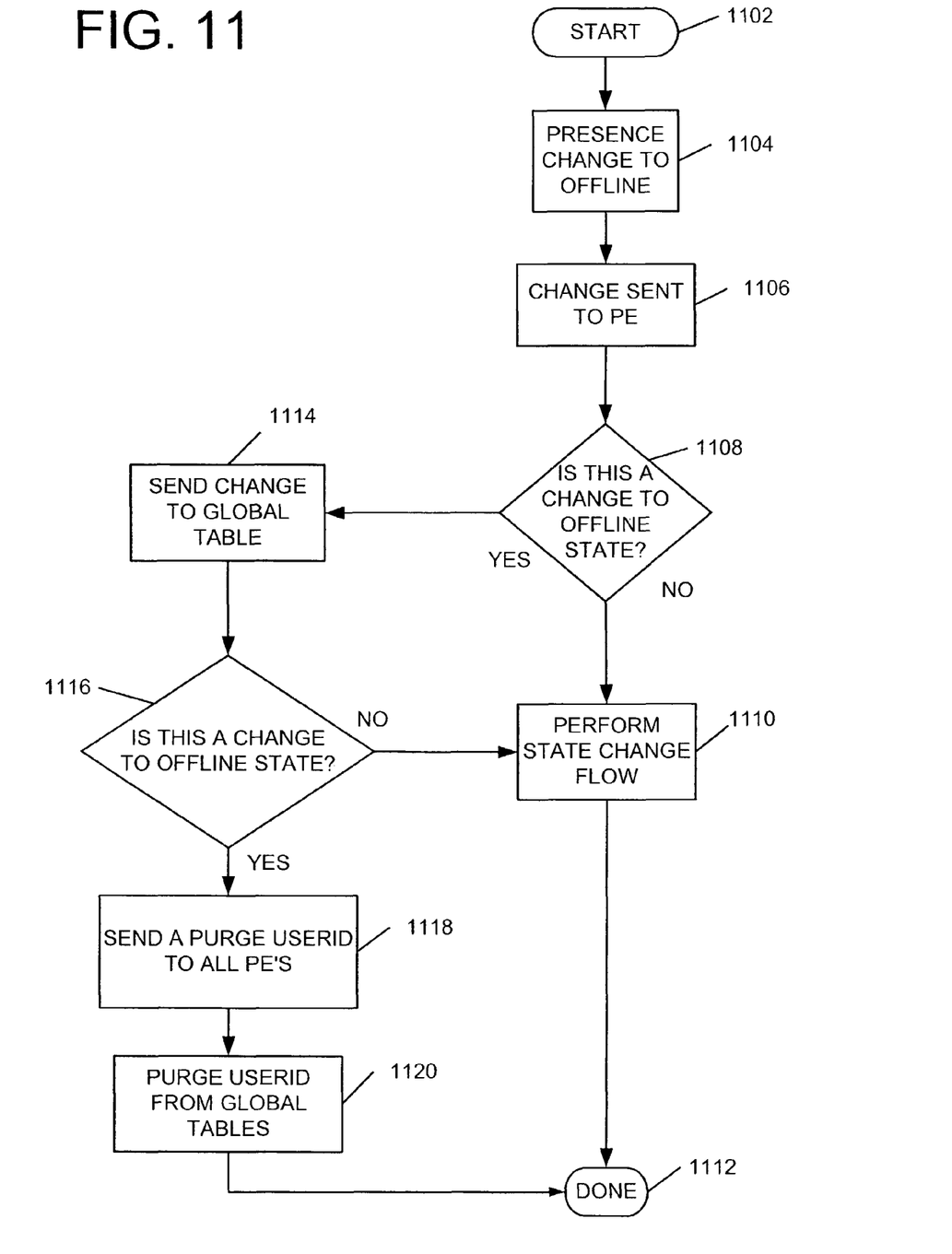
FIG. 11 is a flow chart depicting functionality of a preferred embodiment for implementing a log off process of a high availability presence engine for instant messaging.

FIG. 11 is a flow chart depicting functionality (or method) of a preferred embodiment for implementing a log off process of a high availability presence engine for instant messaging. The process begins at 1102. At 1104 a user's presence changes to offline. At 1106, a presence change is sent to the presence engine. At 1108, a determination is made as to whether the presence change is one that changes to an offline state. If no, at 1110 the state change method is performed. In a preferred embodiment, the state change method described in FIG. 9 is performed. The process ends at 1112.

If the presence change is to an offline state, at 1114, the presence change information is sent to the global table. At 1116, a determination is made as to whether this is a change to an offline state. If no, the process continues at 1110 with the change state method. If yes, at 1118, a purge user ID message is sent to all affected presence engines. At 1120, the user ID is purged from the global tables. The process ends at 1112.

Any process descriptions or blocks in flow charts should be understood as representing modules, segments, or portions of code which include one or more executable instructions for implementing specific logical functions or steps in the process, and alternate implementations are included within the scope of the preferred embodiment of the present invention in which functions may be executed out of order from that shown or discussed, including substantially concurrently or in reverse order, depending on the functionality involved, as would be understood by those reasonably skilled in the art of the present invention.

The preferred embodiment of the present invention provides systems and methods for a presence engine that is load balanced, fault tolerant and requires a presence instance to send only one update to the global table and the global table broadcasts the new presence information to local tables. The preferred embodiment of the present invention provides for reducing the number of update messages passed between presence engines. In addition, the preferred embodiment of the present invention provides a load balanced scalable solution for managing presence information.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

Therefore, having thus described the invention, at least the following is claimed:

1. A system for a high availability presence engine for instant messaging, comprising:

a plurality of presence engines for receiving presence information on users, wherein one of the plurality of presence engines is assigned to a user and the user's contacts;

a global table engine accessible to the plurality of presence engines, the global table engine including user presence information and being operable to receiving presence changes from the plurality of presence engines; and a plurality of local tables accessible to the plurality of presence engines and the global table engine, wherein the plurality of local tables are configured such that each of the plurality of local tables is associated with at least one of the plurality of presence engines and being operable to receive presence change information from the global table engine if the associated local table is affected by the presence change information.

2. The system of claim 1, further comprising a load balancer operatively coupled to the plurality of presence engines, wherein the load balancer distributes and balances the presence information among the plurality of presence engines.

3. The system of claim 2, further comprising a plurality of front end processing devices that are operably coupled to the load balancer, the plurality of front end processing devices adapted to provide an instant messaging service.

4. The system of claim 3, further comprising an instant messaging server configured with an instant messaging application and wherein the plurality of front end processing devices are further configured to include an instant messaging client application.

5. The system of claim 1, wherein the global table engine further comprises a global state table and a global distribution table.

6. The system of claim 5, wherein the global state table further comprises entries that are further configured to include at least one of a user identification, a state identification, a state label or global distribution table pointer.

7. The system of claim 5, wherein the global distribution table further comprises entries that are further configured to include at least one of a user identification or a plurality of presence engine identifications.

8. The system of claim 6, wherein the user identification further comprises a username of a user whose presence is changing.

9. The system of claim 6, wherein the state identification further comprises at least one of an available, away, extended away, do not disturb, or offline state.

10. The system of claim 6, wherein the state label further comprises a personalized text label.

11. The system of claim 7, wherein the user identification further comprises a username of a user whose presence is changing.

12. The system of claim 1, wherein the local table further comprises a local state table and a local distribution table.

13. The system of claim 12, wherein the local state table further comprises entries that include at least one of a user identification, state identification, state label or local distribution table pointer list.

14. The system of claim 13, wherein the state identification further comprises at least one of an available, away, extended away, do not disturb, or offline state.

15. The system of claim 13, wherein the state label further comprises a personalized text label.

16. The system of claim 13, wherein the user identification further comprises a username of a user whose presence is changing.

17. The system of claim 13, wherein the local distribution table pointer list is further configured to point to an entry for the user's contact list.

18. The system of claim 12, wherein the local distribution table further comprises entries that include at least one of a user identification and at least one user identification for contacts.

19. The system of claim 1, further comprising a load balancer operatively coupled to the plurality of presence engines and the global table engine, the load balancer distributes and balances messages among the plurality of presence engines.

20. The system of claim 1, wherein the presence information further comprises at least one of a state change message or a state request message.

21. The system of claim 20, wherein the state change message further comprises at least one of a user identification, a state identification or a state label.

22. The system of claim 21, wherein the user identification further comprises a username of the user whose status is changing.

23. The system of claim 21, wherein the state identification further comprises at least one of an available, away, extended away, do not disturb, or offline state.

24. The system of claim 21, wherein the state label further comprises a personalized text label.

25. The system of claim 20, wherein the state request message further comprises at least one of a user identification, a request type and a plurality of user identification of contacts.

26. The system of claim 25, wherein the user identification further comprises a username of the user who's making a request for status.

27. The system of claim 25, wherein the request type further comprises at least one of status, status all, chat, file Xfer or logon requests.

28. The system of claim 25, wherein the user identification of contacts further comprises a list of contacts to perform the request on.

29. A high availability presence engine, comprising:
a plurality of processors adapted to provide presence information;
a global table accessible to the plurality of processors, the global table including presence information for a plurality of users;
a local table operatively coupled to each processor, the local table including presence information for users associated with one of the plurality of processors associated with that particular local table and being operable to receiving presence information updates from the global table for users associated with that local table; and
a load balancer operatively coupled to the plurality of processors, wherein the load balancer distributes and balances requests from a user to at least one of the plurality of processors having capacity to process the request, wherein the presence engine is assigned to the user and the contacts of the user.

30. The system of claim 29, further comprising front end processing devices that are configured to provide an instant messaging service.

31. The system of claim 30, wherein the front end processing devices are further configured to send presence change and status requests to the load balancer.

32. The system of claim 30, wherein the front end processing devices are operably coupled to a communications network that is adapted to provide the requests to the load balancer.

33. The system of claim 29 wherein the global table further comprises a global state table and a global distribution table.

34. The system of claim 29, wherein the local table further comprises a local state table and a local distribution table.

35. The system of claim 30, wherein the requests include at least one of request for status, status all, chat, file Xfer, or logon.

36. The system of claim 30, wherein the presence information includes at least one of an available, away, extended away, do not disturb or offline state.

37. A method for deploying a high availability presence engine for instant messaging, comprising the steps of:
  receiving a user's presence change information in a global table;
  updating the global table to reflect the change in the user's presence information;
  assigning at least one presence engine to the user and the user's contacts; and
  sending updated presence information on the user to local tables of contacts affected by the change in the user's presence.

38. The method of claim 37, further comprising sending the presence change information from a presence engine.

39. The method of claim 37, further comprising determining whether information on the user is in a local table.

40. The method of claim 39, further comprising updating the local table with the user's updated presence information when information on the user is in the local table.

41. The method of claim 39, further comprising creating an entry in the local table when information on the user is not in the local table.

42. The method of claim 39, wherein the updating the global table to reflect the change in the user's presence information further comprises creating an entry in the global table when information on the user is not in the global table.

43. The method of claim 37, further comprising sending the user's presence change information to a load balancer operatively coupled to a plurality of presence engines, the load balancer balances and distributes the presence change information to an available presence engine.

44. A method for determining status of a user of a high availability instant messaging system, comprising:
  querying for presence status of a user, the presence status of the user supplied by a presence engine, the presence engine assigned to the user and the user's contacts;
  determining whether information on the user resides in a local table; and
  returning the status of the user to the requesting client when information on the user resides in the local table, the status of the user being returned using at least one state label.

45. The method of claim 44, further comprising querying a global table when information on the user does not reside in the local table.

46. The method of claim 45, further comprising returning information on the user to the local table when information on the user resides in the global table.

47. The method of claim 45, further comprising returning an offline state to the requesting client when information on the user does not reside in the global table.

48. A method for removing a user from a high availability presence engine for instant messaging system, comprising:
  receiving from the presence engine a presence change of a user to an offline state, the presence engine assigned to the user and the user's contacts;
  sending the presence change to a global table; and
  purging the user's user identification from the global table.

49. The method of claim 48, further comprising confirming that the presence change is a change to an offline state.

50. The method of claim 48, further comprising sending a purge user identification message to impacted presence engines.

51. The method of claim 49, further comprising performing a state change to the global table and impact local tables when the presence change is not a change to an offline state.

* * * * *